United States Patent Office 2,734,027
Patented Feb. 7, 1956

2,734,027

PHOTOREDUCTION OF REDUCIBLE MATERIALS

Walter J. Nickerson, New Brunswick, and Joseph R. Merkel, Princeton, N. J., assignors to Rutgers Research and Endowment Foundation, New Brunswick, N. J., a nonprofit corporation of New Jersey No Drawing. Application September 17, 1954, Serial No. 456,882

9 Claims. (Cl. 204—157)

Our present invention relates to photoreduction of reducible materials and particularly to a method for converting visible light, which may be either sunlight or artificial light, into energy, which is usable, for example, in the reduction of reducible chemical compounds.

While it is recognized that various ways have been suggested heretofore for converting light energy into other forms of energy, the present invention seeks to accomplish this desirable end by providing a water solution of certain chemical materials, which are readily available and which are sufficiently sensitive to light in the visible range to give a desirable and usable amount of energy in some other form. For example, it may be desired to reduce some chemical material which is of a reducible nature. Among such reducible materials are, for example, silver compounds, which are reducible to form metallic silver and which have been used for many years in the photographic industry. The present invention provides a novel and desirable combination for use in conjunction with the reduction of these silver compounds.

As a further example, a considerable number of dyes and other colored chemical materials may exist in two states: (a) an oxidized form, and (b) a reduced form. Many such materials have different colors in the oxidized and reduced forms respectively. When the oxidized form of one of these materials is reduced in accordance with the present invention, a different material is produced thereby, which is capable of acting as an indicator in detecting the presence of certain oxidizing agents and combinations thereof and which is of relatively great sensitivity in making such detections. For this reason the reduced form of these materials are valuable commercial commodities which may be produced from the oxidized forms respectively in accordance with the method of the present invention. Particular examples of this type of use of the invention will appear hereinafter.

The invention may be summarized as comprising an aqueous solution of an isoalloxazine having the formula:

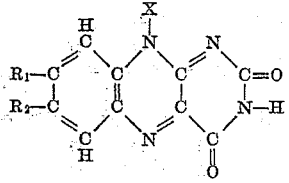

wherein X is selected from the group consisting of ribitol ($-CH_2(CHOH)_3 \cdot CH_2OH$), phosphate derivatives of said ribitol, tetra-acetylated ribitol ($-CH_2(CH \cdot OOC \cdot CH_3)_3 \cdot CH_2OOC \cdot CH_3$)

and succinate ($-OOC \cdot (CH_2)_2 \cdot COOH$), including water-soluble salts of said succinate, and in which $R_1$ and $R_2$ are each selected from the group consisting of hydrogen and lower alkyl groups. In practice, this isoalloxazine is present in the solution in a concentration from about $10^{-6}$ molar up to the maximum water-soluble concentration thereof, i. e., saturation. There is also preferably present in the solution a metal-complexing agent, which may take the form of a sequestering agent or chelating agent. This material is used in accordance with the theories now believed to be correct, to tie up in a complex metal-organic compound form any metal which is present, usually in trace amounts and as an impurity in one or more of the ingredients of the solution, so as to prevent this metal from acting as an inhibitor against the desired photochemical action of the isoalloxazine material aforesaid.

It has been found, for example, that in most commercial materials, such as the commercially available forms of the isoalloxazines according to the present invention, including riboflavin (vitamin $B_2$), as well as in dyes or other reducible materials which may be used therewith as aforesaid, and even in the case of the water itself, which may be used in making up the solution, small or trace amounts of some metals, for example, aluminum, calcium, magnesium and zinc, as well as iron, copper, chromium and manganese (the last group being present usually in smaller amounts) are present. It has further been shown that certain at least of these metals, even in small or trace concentrations, will act to inhibit the photo-sensitive characteristics of the isoalloxazine material. If, however, one or more suitable metal-complexing agents are introduced in the solution, these metals, even if present as aforesaid, will be bound up in some metal-organic complex, the exact nature of which is not pertinent, but in which the metal or metals no longer retain their character as inhibitors. The use of a metal-complexing agent is preferably, therefore, a part of the present invention.

The present invention grew out of certain investigations which are described in a publication of the present inventors, entitled "A Light Activation Phenomenon in the Enzymatic and Nonenzymatic Reduction of Tetrazolium Salts," published in vol. 39, No. 9, pp. 901–905, Proceedings of the National Academy of Sciences, September 1953. The investigation was carried on further and a subsequent article also written by the present inventors and entitled "Riboflavin as a Photocatalyst and Hydrogen Carrier in Photochemical Reduction," was published in vol. 14 (1954) Biochimica et Biophysica Acta, pp. 303–311.

Turning now to the essential active ingredients of the combination and the parts which they play, it was found that one such essential ingredient is riboflavin and its equivalents, which may be generically described as an isoalloxazine having the formula and possible substituents as above set forth. The variations hereinabove suggested for this ingredient comprise all the presently known equivalents thereof. Other materials have been tried but have proven undesirable for reasons which will presently appear. It will be understood that each material tested was dissolved in distilled water. A metal-complexing agent in a kind and amount found to be operative in conjunction with certain of the preferred materials as hereinabove set forth was added and the solution was subjected to light radiation of a type and under conditions which were found to give the best results using riboflavin and the phosphate derivatives thereof, both of which were fully operative as herein noted. Unless otherwise noted, each material was tested as to its photochemical action in reducing a dye and also its ability to give a measurable electrical potential upon potentiometric test. Such other materials which were so tested include:

(1) Uranyl salts (uranyl acetate and uranyl sulfate). These materials were ineffective either to reduce dyes or to give any substantially electrical response when used in solution as the electrolyte in a cell.

(2) Quinone-hydroquinone mixture. Again negative results both for dye reduction and potentiometrically were found.

(3) Trypaflavin (3, 6, diamino-10-methyl acridinium chloride). This material was effective in a slight degree only in reducing a standard dye, triphenyltetrazolium chloride (herein abbreviated as TTC).

(4) Acriflavin. The results were the same as those described above in connection with (3) trypaflavin.

(5) Acridine orange. This material was found to be inactive both from the point of view of dye reduction and potentiometrically.

(6) Quinoline yellow. This material was found to be inactive both from the point of view of dye reduction and potentiometrically.

(7) Vitamin A. This material seems to be operative to a certain limited extent only as a substitute for riboflavin, in that it is somewhat light-sensitive, but the response thereof to light is much slower than in the case of riboflavin, and further it is very slightly soluble in water, so that it is not considered to be within the purview of the present invention.

(8) Chlortetracycline. This material was found to have no apparent action in reducing a dye (TTC).

(9) Quinine. This material was found to give no potentiometric response. It was not tested with a dye; but in general every material which was found to be capable of reducing a dye was found also to give a potentiometric response when so tested.

(10) Atabrine. This material was found not only to be useless as a substitute for riboflavin, but even acted as an inhibitor when added to a solution containing riboflavin.

(11) Acridine. This material developed a small potential when used in a cell in lieu of riboflavin or its equivalents as herein presented, but the results were so small that it is not considered as an equivalent for the purposes of the present application and is not to be considered as coming within the purview of the present invention.

The present invention as aforesaid is an outgrowth of certain work reported in the article published in the Proceedings of the National Academy of Sciences and hereinabove referred to, in which we reported on certain studies on the enzymatic reduction of tetrazolium salts by non-proliferating suspensions of yeast and wherein it was noted that light had a very substantial effect upon the rate of reduction of the dye. It was further noted at that time that riboflavin, one of the isoalloxazines hereinabove referred to, clearly stimulated the photo-reduction of the dye. This led us to a further detailed study, primarily from a purely chemical point of view, to determine the essential characteristics of the photo-reduction reaction noted as aforesaid. The results of certain of these studies are reported in our second paper published in Biochimica et Biophysica Acta and also hereinabove referred to.

We have found that riboflavin, as an example of isoalloxazines, apparently acts as a photocatalyst, in that it appears to be activated by visible light, so as to catalyze the reduction of a reducible material which may be in solution with it.

Our present theory is that the light-activated riboflavin probably splits water, acting as a hydrogen carrier to convey the hydrogen from the water to a reducible material. This action, however, i. e., the effective transfer of hydrogen to a reducible material, appears to be inhibited to a major extent by the presence of very minute amounts of metals, such as are introduced into a solution of riboflavin, possibly as impurities in the commercially available riboflavin itself, possibly as impurities present in the water and/or possibly as impurities in the reducible material introduced into the system. In any event, it is known that usually (with an exception hereinafter set forth) in the absence of a metal-complexing agent, which may be a metal chelator and may also be classed as a sequestering agent, the reducing action is substantially prevented. In the presence of such an agent, capable of tying up minute amounts of metal introduced as aforesaid into some metal-organic complex, the inhibitory action of the metal or metals ceases and the photo-sensitive action of riboflavin, which we have discovered to exist and which may be attributed to the theories hereinabove given, does in fact take place.

There are many known metal chelators with which the art is quite familiar. There are also many materials which while not strictly chelators, may be classed under the broader term of metal-complexing agents. Any such material, which will be effective to tie the metal present up in a complex such that it will not inhibit the photo-reduction of riboflavin and its equivalents, is to be considered to be within the purview of the present invention. Among such materials which have been tried and found to be fully and completely operative are the following:

(a) Ethyleneaminetetraacetic acid and the water-soluble salts thereof. The disodium salt of this acid is commercially available from several commercial sources. This material is sometimes abbreviated "$Na_2EDTA$."

(b) Cysteine. This material appears to operate to obtain desirable results at pH 7 and above.

(c) Mercaptosuccinic acid. This material seems to be operative throughout the entire pH range as hereinafter noted.

(d) Carboxymethylmercaptosuccinic acid. This material also appears to be operative throughout the entire pH range hereinafter noted.

The following materials were tried as metal-complexing agents, but operated either so poorly that their use was believed relatively undesirable or were completely inoperative as compared with some of the desirable materials above noted: sodium citrate, sodium oxalate, glycine (at pH 8), potassium cyanide, dithiozone, various water-soluble salts of phosphoric acid, 8-hydroxyquinoline, o-phenanthroline, Actinomycin and glutathione.

As a further portion of the present studies, tests were made as above generally referred to, to determine the materials which could be substituted for the riboflavin, originally tried, as this ingredient of the composition according to the present invention. The materials which are inoperative for this purpose have been outlined above. The materials which are operative have also been outlined above. Each of these operative materials has in fact been tested as hereinafter noted, and found to be effective either in the photo-reduction of some reducible material or in effecting a conversion of visible light energy to electrical energy as determined by potentiometric measurement, or both.

The concentration of the isoalloxazine material as aforesaid which is required to produce desirable results has been found to be from about $10^{-6}$ molar up to saturation. The low limit of concentration is not narrowly critical. It has been found, for example, that the effective light sensitivity as measured by the potentiometer in a solution gives a progressively less response as the concentration is reduced, considering a fixed light intensity and time of light exposure or radiation. As the concentration is reduced to about $10^{-6}$ molar, for example, a three seconds radiation with a 375 watt incandescent bulb at a distance of about 15 cm., which sufficed with more concentrated solutions of riboflavin to give substantial and measurable results, becomes ineffective to give similar measurable results. On the other hand, with the same intensity-distance illumination, but with a longer time, some such results could be obtained even with this concentration. It is considered, however, that this is about the practical lower limit of concentration which is practically useful in accordance with the invention.

The maximum concentration in the case of many materials, such as riboflavin, is chosen as the saturation concentration at the temperature which is used, i. e. room temperature for example. This is due to the fact that riboflavin per se is, of course, relatively slightly soluble in water. With other materials coming within the general definition hereinabove given of an isoalloxazine, the saturation concentration is substantially higher and need not be approached even for maximum results. It has been found in this connection that maximum results are attained at concentrations substantially less than saturation, although concentrations up to saturation are still operative to give desirable results. The optimum concentration for each material is a matter which can be easily determined by those skilled in the art from the foregoing. For example, it has been found with riboflavin that a concentration of $4 \times 10^{-5}$ molar is a desirable and effective concentration for practical use. This same concentration is also effective even with some of the more soluble members of the general classification of isoalloxazines given above. On the other hand, in the event that the purpose as herein noted is to reduce a reducible material, the concentration of the isoalloxazine material may be increased within the solubility range if a relatively larger amount of reducible material is to be reduced in the system.

The concentration of the metal-complexing agent is largely a matter of experience with a particular combination of other materials being worked upon. From a theoretical point of view and pursuant to our present theories, it is necessary that there be a sufficient amount of the metal-complexing agent to react with all the metal present, from whatever source it may come, in other words, the stoichiometric amount. In view of the fact that the metal or metals in question are present by inadvertence rather than by design, it is practically impossible to calculate the stoichiometric amount. As a result, it is usually the practice to have present a somewhat larger amount of the metal-complexing agent than what would be reasonably expected to be equivalent to the metals present. For example, it has been found that a concentration of Na₂EDTA (as defined above) of $3 \times 10^{-3}$ molar is effective in a system containing riboflavin at a concentration of $4 \times 10^{-5}$ molar and distilled water along with a concentration of $10^{-3}$ molar triphenyltetrazolium chloride (TTC). If, however, the solution is made up using tap water in lieu of distilled water, it is reasonably expected and has been found that a somewhat higher concentration of the metal-complexing agent is desirable.

It has been found that aqueous solutions according to the present invention are fully operative at pH values from about 5 to about 9, neither of these limits being particularly narrowly critical. Under ordinary circumstances, the ingredient materials along with relatively pure (and neutral) water will give solutions within this pH range. It may be, however, in some instances that buffering may be necessary to bring the solution within this general range, if so any suitable and conventional buffering agents may be used.

The reason for choosing these pH limits are as follows: As to the lower limit, it is found that photoreduction reactions become so slow at the more highly acid end of the pH range given above that it is not practical to operate with a pH lower than about 5. This limit may, therefore, be chosen more or less arbitrarily as a practical limit for purposes of the present invention. The higher range limit, i. e. the limit in an alkaline direction, is chosen because as this limit is approached or passed, the isoalloxazine element of the combination appears to be destroyed in high alkaline solutions. Thus, from a practical point of view, the invention operates successfully only within about the range given.

The present invention has been tested practically in the reduction of a considerable number of different reducible materials, many of which are dyes, and certain of which have peculiar utility in their reduced conditions. In connection with the reducing capacity of systems according to the present invention, a group of tests were made using riboflavin and Na₂EDTA, each in the particular concentrations given above. The reducible material in an appropriate concentration was added and the system was irradiated with light using a 375 watt incandescent bulb at a distance of about 15 cm. and with the solution in a glass vessel, which permitted the transmission of visible light to the liquid. The following materials were actively reduced in this way:

Blue tetrazolium
Triphenyltetrazolium chloride
Orange tetrazolium
Iodine
Methylene blue
Toluidine blue
Rosinduline 2B
Trypan blue
o-Dinitrobenzene
p-Nitrobenzaldehyde
Mercuric chloride
Janus green B
Malachite green
Cytochrome c
Nile blue
Phenol blue
Resazurin
Phenol-indo-2, 6 dichlorophenol
Silver salts, as the nitrate.

It is noted that certain of these reducible materials are dyes and are differently colored in their oxidized and reduced states respectively. In this sense the word "color" is used in a broad generic sense to include "colorless" and gray as colors for contrast with some other positive color or with each other. In certain particular instances some of these materials, for example the three tetrazolium compounds, methylene blue, mercuric chloride and the silver salts have a reduced state which is substantially less soluble than the oxidized state respectively. Thus, the present method may be utilized for preparing these materials in their respectively reduced states in which state or condition the respective materials may then be recovered from the solution due to their lesser solubility, and sold or otherwise used as a product of the process. In many instances the reduced materials may be used as indicators in other systems to detect and indicate the presence of oxidizing material or materials in such other systems. Thus, the present method is practically effective in producing indicators, which are of great use in biological research tests, such indicators, for example, being methylene blue, toluidine blue, rosinduline 2B, trypan blue, o-dinitrobenzene, p-nitrobenzaldehyde, mercuric chloride, janus green B, malachite green, cytochrome c, nile blue, phenol blue, resazurin and phenol-indo-2, 6 dichlorophenol.

While a considerable number of oxidizable and reducible materials have been listed herein and the desirable properties of the present process has been tested thereagainst, this list is by no means exhaustive, but merely indicates certain materials which have in fact been tested, rather than purporting to indicate all the materials to which the present process is applicable. As a practical matter, the only limitation is that the reducible chemical material, which may be reduced according to the present process or method, must be one having a redox potential which is substantially more positive than that of the isoalloxazine which is used in carrying out the process.

An additional possible use of the present invention, however, remains to be described, that is, in connection with the photoreproduction of material by utilizing the capacity of the system for photoreduction of a reducible material, for example, tetrazolium compounds, so as selectively to reduce such salts at any portion only of the system which is directly subjected to light radiation. If the system is created in a slightly moist or semi-solid film, simulating in effect the solution used in other embodiments of the invention, it has been found by actual tests that portions only of such a semi-solid film including the several ingredients hereinabove described and further including a reducible tetrazolium salt may be exposed to light in a manner similar to the light-exposure of a photographic negative, since it has been found that the system is effective in reducing other materials, such as silver compounds. The portion so exposed to light will be found to have reduced tetrazolium compounds thereon, while portions not so exposed will not have the tetrazolium salts in a non-reduced form. A photographic reproduction can, therefore, be made by this process. It is contemplated that other photo-reducible materials may be substituted for the tetrazolium compounds actually tried by following the teachings of the present invention and within the purview thereof.

While there is herein described a number of embodiments of the invention, other possible equivalents or embodiments thereof will occur to those skilled in the art from the foregoing description. We do not wish to be limited, therefore, except by the scope of the appended claims, which are to be construed validly as broadly as the state of the art permits.

What is claimed is:

1. The method of effecting the photoreduction of a reducible chemical material, comprising the steps of preparing an aqueous solution of an isoalloxazine having the formula:

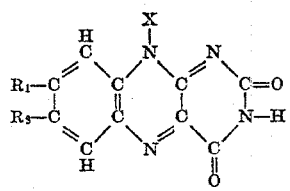

wherein X is selected from the group consisting of ribitol ($-CH_2(CHOH)_3 \cdot CH_2OH$), phosphate derivatives of ribitol, tetraacetylated ribitol ($-CH_2(CH \cdot OOC \cdot CH_3)_3 \cdot CH_2OOC \cdot CH_3$)

succinate ($-OOC \cdot (CH_2)_2 \cdot COOH$), and water-soluble salts of succinate, and in which $R_1$ and $R_2$ are each selected from the group consisting of hydrogen and lower alkyl groups, said isoalloxazine being present in a concentration from about $10^{-6}$ molar up to the maximum water-soluble concentration thereof, also establishing in said solution as a solute therein a metal-complexing agent in a concentration at least stoichiometrically equivalent to the total of the metals present in the solution which are capable of combining with said metal-complexing agent to form metal-organic complexes, also establishing in said solution as a solute therein a reducible chemical material to be reduced by photoreduction in the solution and in which said reducible chemical material has a redox potential substantially more positive than that of said isoalloxazine which is present in said solution, and exposing the solution made up as aforesaid and including said reducible material to visible light to effect photoreduction of said reducible material.

2. The method in accordance with claim 1, in which said metal-complexing agent is a soluble salt of ethylene-diamine-tetra-acetic acid.

3. The method in accordance with claim 1, in which said metal-complexing agent is cysteine and in which the pH of the solution is at least about 7.

4. The method in accordance with claim 1, in which said metal-complexing agent is mercapto-succinic acid.

5. The method in accordance with claim 1, in which said metal-complexing agent is carboxy-methyl-mercapto-succinic acid.

6. The method in accordance with claim 1, in which the substituents, $R_1$ and $R_2$, in the isoalloxazine formula given are each methyl.

7. The method in accordance with claim 1, in which said reducible chemical material is one which changes color when reduced and further is one in which the reduced form may be reoxidized to its initial state by bringing into contact therewith an oxidizing chemical agent, whereby the reduced material produced as a product of the present process may be used as an indicator to show the presence of a chemical agent capable of reoxidizing said reduced chemical material.

8. The method in accordance with claim 1, in which said reducible chemical material is a dye, which has a substantial water-solubility in both its oxidized and reduced states.

9. The method in accordance with claim 1, in which said reducible chemical material is one having a reduced form which is capable of being reoxidized by bringing it into contact with an oxidizing agent, in which the reduced and oxidized forms in aqueous solution are distinguishable from one another by color, and in which the reduced form is relatively less soluble in water than is the oxidized form, so that the reduced form, which is a product of the present method, may be separated from the remainder of the solution due to its limited solubility as a product of the present method.

References Cited in the file of this patent

UNITED STATES PATENTS

| | | |
|---|---|---|
| 1,887,531 | Wein | Nov. 15, 1932 |
| 1,941,494 | Ruben | Jan. 2, 1934 |
| 2,604,442 | Lambert et al. | July 22, 1952 |

OTHER REFERENCES

Proceedings of the National Academy of Sciences, vol. 39, No. 9 (Sept. 1953), pp. 901–905.

Biochemica et Biophysica Acta, vol. 14 (1954), pp. 303–311.

Oster: Photographic Engineering, vol. 4, No. 3 (1953), pp. 173–178.